UNITED STATES PATENT OFFICE.

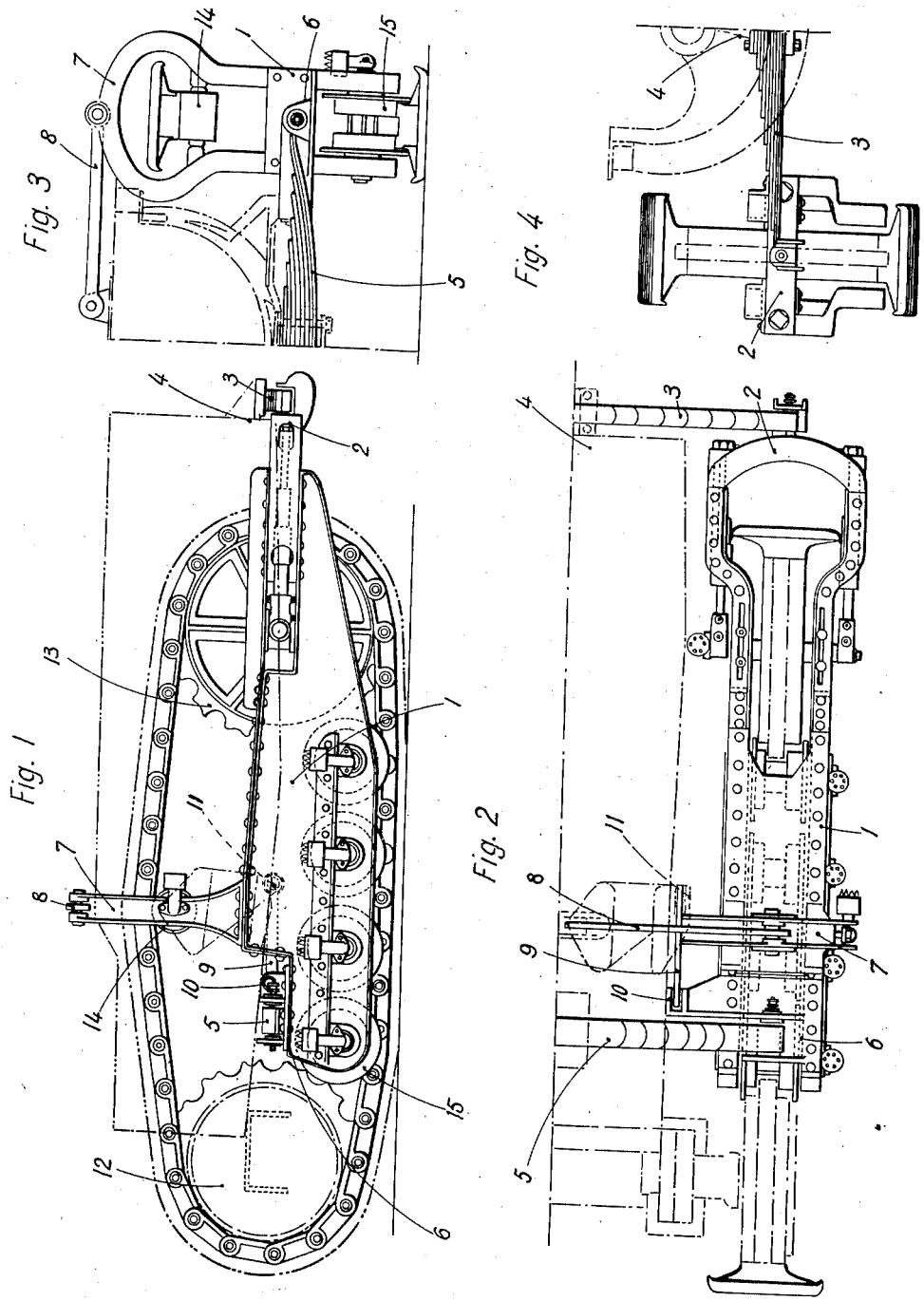

PIERRE L. LEISSE, OF BOULOGNE, FRANCE, ASSIGNOR TO LOUIS RENAULT, OF BILLANCOURT, FRANCE.

MEANS FOR SUSPENDING ENDLESS-TRACK VEHICLES.

1,367,060.     Specification of Letters Patent.     Patented Feb. 1, 1921.

Application filed February 25, 1920. Serial No. 361,193.

*To all whom it may concern:*

Be it known that I, PIERRE L. LEISSE, citizen of the French Republic, residing at Boulogne, Department of the Seine, in France, have invented certain new and useful Improvements in Means for Suspending Endless-Track Vehicles; and I do hereby declare the following to be a full, clear, and exact description of the invention, such as will enable others skilled in the art to which it appertains to make and use the same.

The present invention has for its object to provide means for suspending endless track vehicles of the chain type, the main advantage of the present means being that the said means not only insure the resilient suspension of the vehicle but also the efficient connection of the vehicle body frames or chain carrying beams to the chassis of the vehicle. In the means forming the subject of the present invention the suspension is obtained by two transverse springs one at the front and one at the rear, the said springs being connected at their ends to the beams by means of joints and secured at the middle to the chassis of the vehicle. The chain carrying frames or beams are supported at the side and protected against any warping or bending action by means of articulated rods, the springs and rods acting after the manner of a deformable parallelogram.

In order that the invention may be clearly understood reference is made to the accompanying drawing, whereon:—

Figure 1 is an elevation of the chassis of a chain-type of tractor provided with suspending means in accordance with the present invention.

Fig. 2 is a half plan of the vehicle shown in Fig. 1.

Fig. 3 is a half rear end view and Fig. 4 is a half front end view of the vehicle under consideration.

Referring to the drawing, a pair of frames or beams 1 carrying the tracks are each provided at the forward end with a cross piece 2 which is easily demountable, on which is articulated one end of a transverse spring 3 shown as a laminated spring. The spring 3 is fixed at its mid point to the chassis of the vehicle. A further spring 5 fixed at its mid point to the chassis similarly to the forward spring, is articulated at one end to the rear part 6 of the beams 1, each of the latter carrying an upright extended piece 7 in the form of a cradle through which passes the upper run or length of the respective chain. The uprights serve to connect the beams to the chassis of the vehicle by means of articulated links or rods which in the constructional form shown comprise rods 8 articulated at one end to the uprights 7 and at the other end to the chassis of the vehicle.

The thrust of the driving run of the endless track is taken up by the thrust rods 9 articulated at one end at 10 to the chain carrying beams and at the other end to the chassis of the vehicle as at 11.

The chains as usual pass around a driving sprocket 12 or chain wheel rigid with the chassis and around a steering wheel 13 carried by the beam and capable of being displaced longitudinally of the vehicle in order to regulate the tension on the chain track. The upright 7 carries a pulley 14 used for tensioning the upper run of the chain. Rollers 15 are provided at the lower part of the beams in order to insure the support of the vehicle on the chains.

It is obvious that on account of the hereinbefore described method of suspension, the tracks are always displaced during working in a plane which always remains parallel to the longitudinal median plane of the chassis. The arrangement of rods and springs works after the manner of a deformable parallelogram.

Claims:

1. A mounting for endless track vehicles, comprising supporting beams, traction chains carried thereby, front and rear transverse springs pivotally supported at their ends upon said beams, a chassis supported upon and rigidly connected to said springs intermediate the ends thereof, uprights carried by said beams providing guide-ways for the upper run of each chain, and stay rods connecting the upright of each beam to said chassis.

2. A mounting for endless track vehicles, comprising supporting beams, traction chains carried thereby, front and rear transverse springs pivotally supported at their ends upon said beams, a chassis supported upon and rigidly connected to said springs intermediate the ends thereof, uprights carried by said beams providing guide-ways for the upper run of each chain, rollers journaled in said uprights for supporting the upper run of each chain, and stay rods connecting the upright of each beam to said chassis.

In testimony whereof I affix my signature, in presence of two witnesses.

PIERRE L. LEISSE.

Witnesses:
 EMILE KLOTZ.
 LOUIS TORRO.